United States Patent
Petruchik

(10) Patent No.: US 6,614,499 B1
(45) Date of Patent: Sep. 2, 2003

(54) ELECTRICALLY ADDRESSABLE DISPLAY SYSTEM WITH ALIGNMENT REFERENCE FEATURES AND PROCESS FOR FORMING SAME

(75) Inventor: Dwight J. Petruchik, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 328 days.

(21) Appl. No.: 09/640,320

(22) Filed: Aug. 16, 2000

(51) Int. Cl.$^7$ ............................................. G02F 1/1336
(52) U.S. Cl. ...................... 349/149; 349/152; 349/150
(58) Field of Search ................................ 349/149, 150, 349/152

(56) References Cited

U.S. PATENT DOCUMENTS

| | | | |
|---|---|---|---|
| 4,435,047 A | | 3/1984 | Fergason |
| 4,685,771 A | | 8/1987 | West et al. |
| 4,784,883 A | | 11/1988 | Chitwood et al. |
| 5,002,493 A | | 3/1991 | Brown et al. |
| 5,116,528 A | | 5/1992 | Mullen et al. |
| 5,437,811 A | | 8/1995 | Doane et al. |
| 5,583,670 A | | 12/1996 | Iijima et al. |
| 5,607,882 A | | 3/1997 | Lambert et al. |
| 5,982,468 A | * | 11/1999 | Satuo et al. ................. 349/149 |
| 6,211,935 B1 | * | 4/2001 | Yamada ....................... 349/149 |
| 6,266,119 B1 | * | 7/2001 | Takahashi et al. .......... 349/149 |
| 8,331,883 | * | 12/2001 | Hasegawa et al. .......... 349/149 |
| 6,342,932 B1 | * | 1/2002 | Terao et al. ................. 349/149 |
| 6,356,333 B1 | * | 3/2002 | Uchiyama ................... 349/149 |

FOREIGN PATENT DOCUMENTS

JP 5-35185 * 7/1991 ................. 349/149

* cited by examiner

Primary Examiner—James Dudek
(74) Attorney, Agent, or Firm—Raymond L. Owens

(57) ABSTRACT

An electrically addressable display system includes a circuit board and at least one flexible display sheet disposed above and electrically connected with the circuit board. The surface of the circuit board includes first electrically conductive contacts and at least one first reference feature disposed at a selected position in relation to the first contacts. The display sheet includes second electrically conductive contacts disposed on a transparent flexible substrate and at least one second reference feature disposed at a selected position in relation to the second contacts. The second reference feature of the display is in vertical alignment with the first reference feature of the circuit board, thereby providing for alignment of the first electrically conductive contacts on the circuit board with the second electrically conductive contacts on the display sheet. An electrically addressable liquid crystal display system includes a circuit board and at least one liquid crystal display sheet electrically connected with the circuit board. By means of reference pins on the circuit board and corresponding reference holes in the liquid crystal display sheet, arrays of conductive contacts on the circuit board are aligned with the arrays of conductive traces on the display sheet. A process for forming an electrically addressable liquid crystal display system that includes a circuit board and at least one liquid crystal display sheet electrically connected with the circuit board ensures alignment of the conductive contact arrays on the circuit board with the conductive trace arrays on the display sheet.

32 Claims, 3 Drawing Sheets

ELECTRICALLY ADDRESSABLE DISPLAY SYSTEM WITH ALIGNMENT REFERENCE FEATURES AND PROCESS FOR FORMING SAME

CROSS REFERENCE TO RELATED APPLICATIONS

Reference is made to commonly assigned U.S. patent application Ser. No. 09/628,082 filed Jul. 28, 2000, entitled "Selective Removal of Light Modulating Layer From Electrically Conductive Layer of Liquid Crystal Display Substrate" by Dwight J. Petruchik and U.S. patent application Ser. No. 09/627,802 filed Jul. 28, 2000, entitled "Process for Laminating Electrically Addressable Display" by Dwight J. Petruchik, the disclosures of which are incorporated herein by reference.

FIELD OF THE INVENTION

The present invention relates to electrically addressable displays and, more particularly, to an electrically addressable liquid crystal display system comprising a circuit board and a display sheet on a flexible substrate, the circuit board and display sheet being aligned by reference features such as pins and corresponding holes.

BACKGROUND OF THE INVENTION

Images can be displayed on ink-bearing sheets of paper or on various electronically modulated surfaces such as cathode ray displays or liquid crystal displays, the latter comprising liquid crystalline materials that can be manipulated between light scattering and light transmissive modes in response to applied electric fields. Liquid crystalline materials, which may have either positive or negative dielectric anisotropy, are generally classified as nematic or smectic. A particular type of nematic liquid crystals, referred to as chiral nematic, has the ability to selectively reflect one component of circularly polarized light. In the chiral nematic phase, which is synonymous with the cholesteric phase, chiral molecules form very thin layers of aligned molecules, the alignment in one layer being at a slight angle from that in an adjacent layer, and the alignment in a stack of such layers forming a continuous helical pattern.

Many known liquid crystal display devices make use of liquid crystalline materials dispersed in polymeric matrices. For example, U.S. Pat. No. 4,435,047, the disclosure of which is incorporated herein by reference, describes a liquid crystalline material, preferably nematic, of positive dielectric anisotropy dispersed in a polymeric encapsulating medium such as polyvinyl alcohol. Also, U.S. Pat. No. 4,685,771, the disclosure of which is incorporated herein by reference, describes a light-modulating liquid crystal display material that contains liquid crystalline microdroplets dispersed in a thermoplastic resin, the microdroplets being of a size effective to scatter incident light when the optical axes of the microdroplets are randomly aligned. U.S. Pat. No. 5,116,528, the disclosure of which is incorporated herein by reference, describes a light modulating material that includes a liquid crystalline material dispersed in a crosslinked isocyanate material, preferably a polyacrylic urethane. Also, U.S. Pat. No. 5,583,670, the disclosure of which is incorporated herein by reference, describes an information recording layer in which a liquid crystal phase is dispersed in an acrylic or methacrylic resin having a molecular weight of 25,000 to 100,000.

PCT/WTO 97/04398, entitled ELECTRONIC BOOK WITH MULTIPLE DISPLAY IMAGES, discloses the assembly of multiple electronically written display sheets into a "book." The reference describes prior art techniques for forming thin, electronically written pages, including flexible sheets, image modulating material formed from a bi-stable liquid crystal system, thin metallic conductor lines on each page, and transparent conducting polymers formed over the light modulating material.

Co-pending, commonly assigned U.S. application Ser. No. 09/379,776, filed Aug. 24, 1999 for FORMING A DISPLAY HAVING CONDUCTIVE IMAGE AREAS OVER A LIGHT MODULATING LAYER, the disclosure of which is incorporated herein by reference, describes a method for forming a display on a transparent substrate on which is formed a transparent, electrically conductive coating. A light modulating layer including liquid crystalline material in a polymer binder is formed over the electrically conductive layer, and an opaque conductive material is deposited in an imagewise pattern over the light modulating layer in the form of viewable and conductive images. The light modulating layer is effective in a first condition to prevent the viewing of the viewable and conductive images and in a second condition to permit the viewing of the viewable and conductive images. Electrical connections enable an electrical field to be applied across selected ones of the viewable and conductive images and the transparent electrically conductive layer to cause the light modulating layer underlying the selected images to change from the first condition to the second condition and thereby present the images for viewing by a viewer.

Display systems, in particular, matrixed displays typically have a large number of conductive traces for addressing the individual pixel elements comprising the display. These conductive traces are electrically connected to a circuit board on which control driver chips for the display are mounted.

SUMMARY OF THE INVENTION

Accurately aligning the many fine conductive traces to the corresponding conductive contacts on the circuit board is a difficult process, which, however, is substantially facilitated by the present invention The present invention is directed to an electrically addressable display system that includes a circuit board and at least one flexible display sheet disposed above and electrically connected with the circuit board. The surface of the circuit board includes first electrically conductive contacts and at least one first reference feature disposed at a selected position in relation to the first contacts. The display sheet includes second electrically conductive contacts disposed on a transparent flexible substrate and at least one second reference feature disposed at a selected position in relation to the second contacts. The second reference feature of the display is in vertical alignment with the first reference feature of the circuit board, thereby providing for alignment of the first electrically conductive contacts on the circuit board with the second electrically conductive contacts on the display sheet.

The present invention is further directed to an electrically addressable liquid crystal display system that includes a circuit board and at least one liquid crystal display sheet electrically connected with the circuit board. A surface of the circuit board includes a first array of parallel conductive contacts and a second array of parallel conductive contacts. The second array is orthogonally disposed to the first array, and each array is bounded by two parallel edges. Two reference pins, each disposed at a selected distance from one of the conductive contact array edges and from one another, protrude from the circuit board surface.

The flexible liquid crystal display sheet disposed above and electrically connected with the circuit board includes a transparent flexible substrate, a transparent first electrically conductive layer comprising a first array of parallel conductive traces bounded by two parallel edges disposed on the substrate, a light modulating layer comprising a liquid crystalline material dispersed in a polymeric binder disposed on the first electrically conductive layer, and a second electrically conductive layer comprising a second array of parallel conductive traces bounded by two parallel edges disposed on the light modulating layer. The conductive trace arrays are orthogonally disposed to each other, and each of the conductive traces in the arrays is in electrical communication with a conductive contact in the contact arrays, thereby defining rows and columns of pixels.

The liquid crystal display sheet further includes two reference holes through the display. Each of the holes is disposed at a selected distance from one of the conductive trace array edges and from one another, and each hole is in vertical alignment with and engaged with a corresponding pin on the underlying circuit board. The arrays of conductive contacts on the circuit board are thereby aligned with the arrays of conductive traces on the liquid crystal display sheet.

The present invention is further directed to a process for forming an electrically addressable liquid crystal display system that comprises: providing a circuit board having a surface comprising a first array of parallel conductive contacts and a second array of parallel conductive contacts orthogonally disposed to the first array, each of the arrays being bounded by two parallel edges; and two reference pins protruding from the surface, each of the pins being disposed at a selected distance from one of the conductive contact array edges and from one another. Further provided is at least one liquid crystal display sheet comprising a flexible substrate, a transparent first electrically conductive layer comprising a first array of parallel conductive traces bounded by two parallel edges disposed on the substrate, a light modulating layer comprising a liquid crystalline material dispersed in a polymeric binder disposed on the first electrically conductive layer, and a second electrically conductive layer comprising a second array of parallel conductive traces bounded by two parallel edges disposed on the light modulating layer. The conductive trace arrays are orthogonally disposed to each other, and each of the traces in the arrays is in electrical communication with a conductive contact in the contact arrays, thereby defining rows and columns of pixels.

The process of the invention further comprises: forming two reference holes through the liquid crystal display sheet, each of the holes being disposed at a selected distance from one of the conductive trace array edges and from one another; and positioning the liquid crystal display on the circuit board to cause the pins to be in vertical alignment with and to engage the holes. The arrays of conductive contacts on the circuit board are thereby aligned with the arrays of conductive traces on the liquid crystal display.

DETAILED DESCRIPTION OF THE INVENTION

The present invention provides for the alignment of the conductive contacts of a circuit board with those of a flexible display sheet through the inclusion of reference features on both the circuit board and the display sheet. These corresponding reference features, whose dimensions are selected to ensure precise alignment with one another, can include tactile indicia such as one or more pins or other protrusions that fit into corresponding holes or embossed dimples in the display sheet. Alternatively, one or more dimples embossed in the reverse direction in the display sheet can be aligned with corresponding holes or depressions in the circuit board. As a further alternative, the reference features of both the circuit board and display sheet can each include one or more holes that are aligned with one another by pins or other protrusions on an assembly surface.

Figure 1:
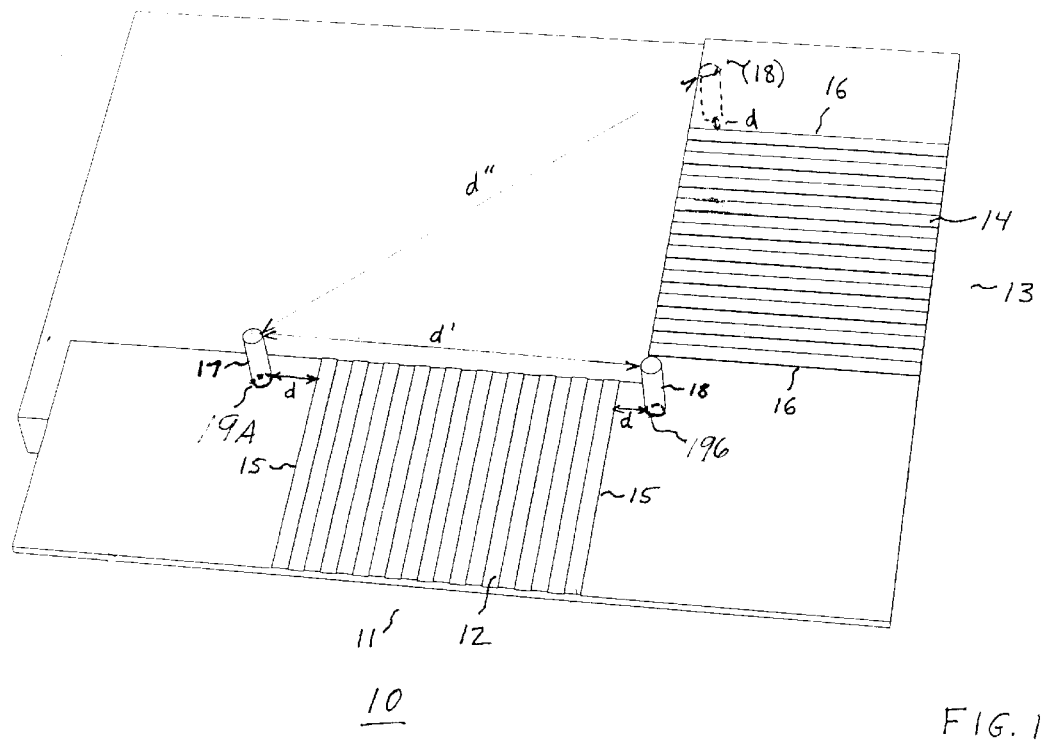
FIG. 1 is a perspective view of a circuit board employed in the display system of the present invention.

In FIG. 1 is depicted a circuit board 10 that includes a first array 11 of parallel conductive contacts 12 and a second array 13 of parallel conductive contacts 14, which are connected to an integrated drive circuit (not shown). Arrays 11 and 13, which are orthogonally disposed to one another, are each bounded by parallel edges 15 and 16, respectively. Circuit board 10 also includes two protruding reference pins 17 and 18 that are at a selected distance d from edges 15 and at a selected distance d' from one another. If desired, pin 18 can be located, as shown in phantom, at a selected distance d from the edge 16 of second array 13 that is furthest away from first array 11 and at a distance d" on a diagonal from pin 17.

Conductive contact arrays 11 and 13 can be formed by patterning a metal layer on the surface of circuit board 10 by means well known in the art. Pins 17 and 18 can be attached to circuit board 10 either by affixing them directly to the board surface or by inserting them in holes 19a and 19b, respectively drilled into the board. If desired, holes 19a and 19b can serve as reference features for pins located on an underlying assembly surface (not shown).

Figure 2:
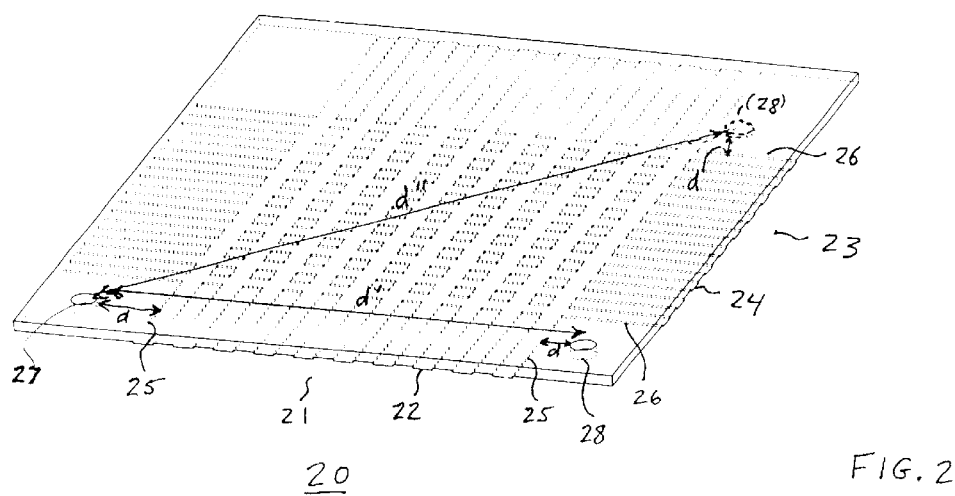
FIG. 2 is a perspective view of a liquid crystal display sheet included in the display system of the present invention.

In FIG. 2 is depicted a liquid crystal display sheet 20 that includes a first array 21 of parallel conductive traces 22 and a second array 23 of parallel conductive traces 24. Arrays 21 and 23, which are orthogonally disposed to one another, are each bounded by parallel edges 25 and 26, respectively. Display sheet 20 also includes two reference holes 27 and 28 that are at a selected distance d from edges 25 and at a selected distance d' from one another. If desired, hole 28 can be located, as shown in phantom, at a selected distance d from the edge 26 of second array 23 that is furthest away from first array 21 and at a distance d" on a diagonal from hole 27.

Figure 3:
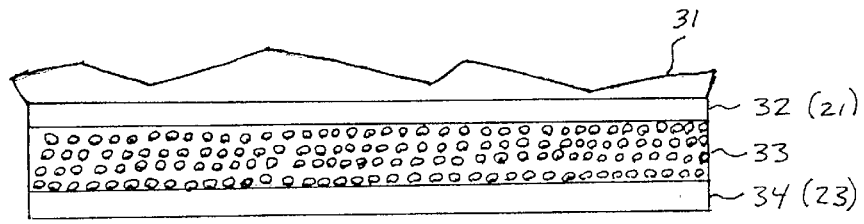
FIG. 3 is a schematic cross-sectional view of the liquid crystal display sheet.

FIG. 3 is a schematic cross-sectional view of liquid crystal display sheet 20, showing a transparent flexible substrate 31, a transparent first electrically conductive layer 32, a liquid crystal-containing light modulating layer 33, and a second electrically conductive layer 34. Transparent flexible substrate 31 is formed from polymeric materials such as, for example, polyesters, polyolefins, polycarbonates, vinyl resins, acrylic resins, and methacrylic resins. First electrically conductive layer 32, preferably comprising indium-tin oxide (ITO), can be formed by sputtering onto substrate 31, then patterned to form first conductive trace array 21 by, for example, laser or chemical etching.

Light modulating layer 33 includes a liquid crystalline, preferably cholesteric, material dispersed in a polymeric binder such as, for example, deionized gelatin, a polyolefin, a polystyrenes, an acrylic or methacrylic resin, a urethane resin, or an epoxy resin.

Second electrically conductive layer 34 is patterned to form second conductive trace array 23. Conductive layer 34 can, like layer 32, include indium-tin oxide (ITO), whose transparency characteristics are particularly useful for the construction of display systems containing more than one the liquid crystal display sheet, for example, a full color display comprising three sheets disposed one above to the other, one being reflective of green light, a second reflective of blue light, and a third reflective of red light.

For monochrome display systems, second electrically conductive layer 34 can include an opaque conductive material, for example, a conductive ink printed to form array 23, as described in the co-pending, commonly assigned U.S. application Ser. No. 09/379,776 discussed above.

Figure 4:
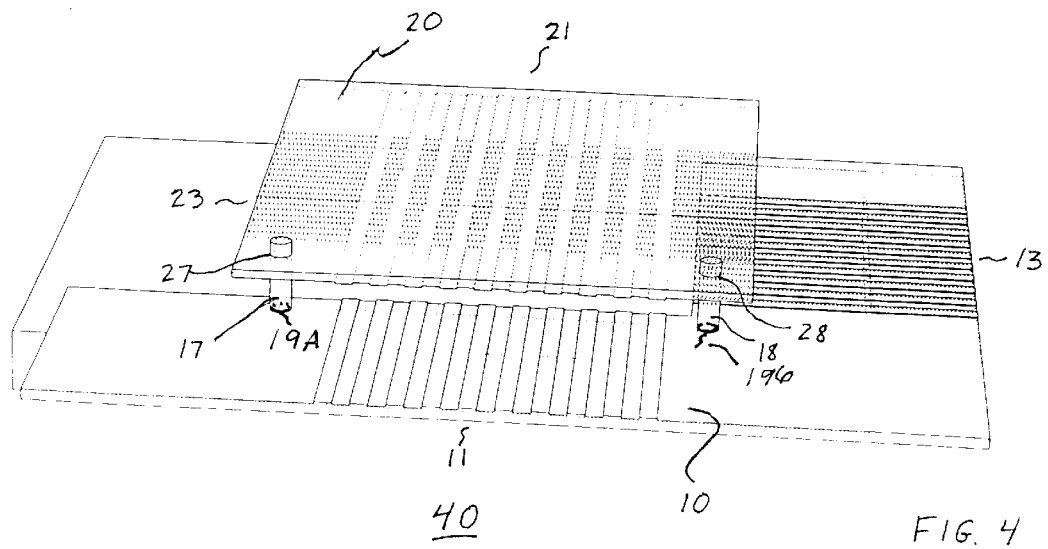
FIG. 4 is a perspective view of the circuit board and liquid crystal display sheet comprising the display system of the present invention.

FIG. 4 depicts an electrically addressable liquid crystal display system 40 of the present invention, which is constructed by positioning liquid crystal display sheet 20 on circuit board 10 by vertically aligning reference pins 17 and 18 with reference holes 27 and 28, respectively. Alternatively, holes 27 and 28 can be vertically aligned with holes 19a and 19b, respectively, in circuit board 10, using reference pins protruding from an underlying assembly surface (not shown). Conductive contact arrays 11 and 13 on circuit board 10 are thereby aligned with conductive trace arrays 21 and 23 on display sheet 20. Each of the conductive traces 22 and 24 in arrays 21 and 23, respectively, is in electrical communication with a corresponding conductive contact 12 and 14 in arrays 11 and 13, respectively, thereby defining columns and rows of pixels in display system 40. Following alignment, circuit board 10 and display sheet 20 can, if desired be maintained in contact by various means, for example, by clamping.

Figure 5:
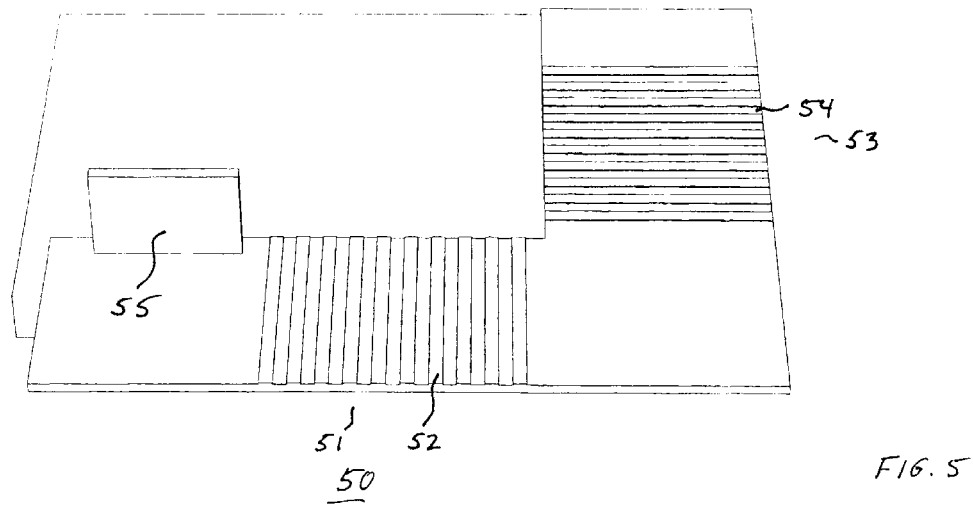
FIGS. 5 and 6 are perspective views of further embodiments of, respectively, a circuit board and a display sheet included in the display system of the present invention.
Figure 6:
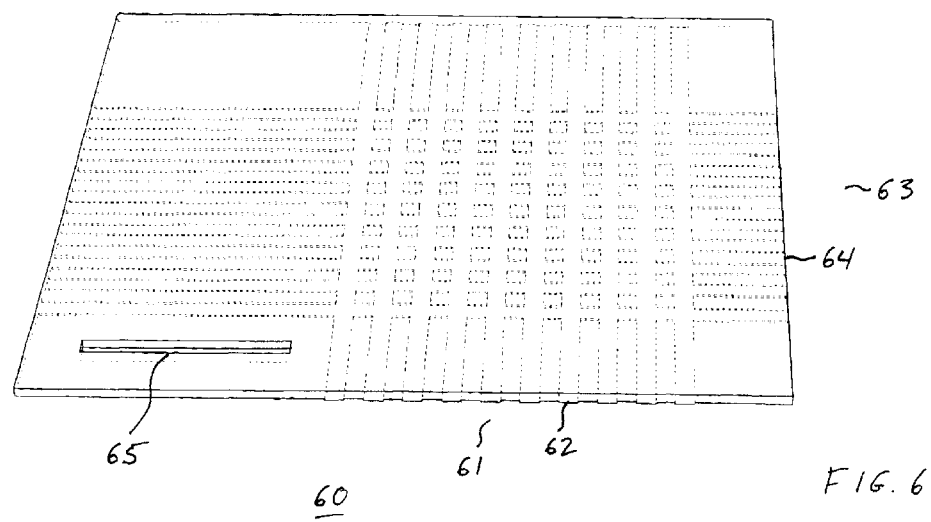

FIGS. 5 and 6 depict further embodiments of, respectively, a circuit board 50 and a display sheet 60 useful for assembling into a display system in accordance with the present invention. Circuit board 50 includes a first array 51 of parallel conductive contacts 52 and a second array 53 of parallel conductive contacts 54, which are orthogonally disposed to one another and are connected to an integrated drive circuit (not shown). Circuit board 50 further includes a reference feature that includes a surface protrusion 55 that has a lateral rectangular cross-section and is disposed at a selected position in relation to arrays 51 and 53 of electrically conductive contacts.

Display sheet 60, shown in FIG. 6, includes a first array 61 of parallel conductive traces 62 and a second array 63, orthogonally disposed to array 61, of parallel conductive traces 64. Display sheet 60 also includes a reference feature that includes a rectangular slot 65 that is disposed at a selected position in relation to arrays 61 and 63 of electrically conductive contacts and has dimensions substantially corresponding to those of the lateral rectangular cross-section of protrusion 55. Features 55 and 65 enable the alignment electrically conductive contact arrays 51 and 53 on circuit board 50 with electrically conductive contact arrays 61 and 63 on display sheet 60 in a manner analogous to that described for display system 40 and illustrated in FIG. 4.

Thus, the present invention provides for a convenient means for accurately and reliably aligning the many fine conductive traces of the display sheet to the corresponding conductive contacts on the circuit board.

The invention has been described in detail for the purpose of illustration, but it is to be understood that such detail is solely for that purpose, and variations can be made by those skilled in the art without departing from the spirit and scope of the invention, which is defined by the following claims.

PARTS LIST 10 circuit board
11 first array
12 parallel conductive contacts
13 second array
14 parallel conductive contacts
15 parallel edge
16 parallel edge
17 reference pins
18 reference pins
19a holes
19b holes
20 display sheet
21 first array
22 conductive traces
23 second array
24 conductive traces
25 parallel edge
26 parallel edge
27 reference hole
28 reference hole
31 flexible substrate
32 conductive layer
33 light modulating layer
34 conductive layer
40 crystal display system
50 circuit board
51 first array
52 conductive contacts
53 second array
54 conductive contacts
55 surface protrusion
60 display sheet
60 display sheet
61 first array
62 conductive traces
63 second array
64 conductive traces
65 rectangular slot

What is claimed is:

1. An electrically addressable display system comprising:
 a circuit board having a surface comprising first electrically conductive contacts and at least one first reference feature disposed at a selected position in relation to the first electrically conductive contacts; and
 at least one flexible display sheet disposed above and electrically connected with the circuit board, the display sheet comprising second electrically conductive contacts disposed on a transparent flexible substrate and at least one second reference feature disposed at a selected position in relation to the electrically second conductive contacts, the second reference feature of the display being in vertical alignment with the first reference feature of the circuit board;
 whereby the first electrically conductive contacts on the circuit board are aligned with the second electrically conductive contacts on the display sheet.

2. The display system of claim 1 wherein the display sheet further includes a light modulating layer comprising a liquid crystalline material disposed on the second electrically conductive contacts and third electrically conductive contacts disposed on the light modulating layer.

3. The display system of claim 1 wherein the first electrically conductive contacts on the circuit board include a first array of parallel conductive contacts and a second array of parallel conductive contacts orthogonally disposed to the first array.

4. The display system of claim 2 wherein the second electrically conductive contacts include a first array of parallel conductive traces and the third electrically conductive contacts includes a second array of parallel conductive traces, the arrays being orthogonally disposed to each other.

5. The display system of claim 2 wherein the light modulating layer includes a cholesteric liquid crystalline material dispersed in a polymeric binder.

6. The display system of claim 1 wherein the first reference feature on the circuit board includes a surface protrusion having a lateral rectangular cross-section, and the second reference feature on the display sheet includes a rectangular slot having dimensions substantially equivalent to the lateral rectangular cross-section of the surface protrusion.

7. The display system of claim 1 wherein the first reference feature on the circuit board includes two protruding pins each having a selected cross-section, and the second reference feature on the display sheet includes two holes, at least one of the holes a dimension substantially equivalent to a selected cross-section of the pins.

8. The display system of claim 1 wherein the first reference feature on the circuit board includes two holes, and the second reference feature on the display sheet includes two holes having dimensions substantially equivalent to dimensions of the holes comprising the first reference feature.

9. The display system of claim 8 wherein the first reference feature on the circuit board includes two circular holes having a selected diameter, and the second reference feature on the display sheet includes two circular holes having a diameter substantially equivalent to the diameter of the holes comprising the first reference feature.

10. The display system of claim 2 wherein the second and third electrically conductive contacts include indium-tin oxide.

11. The display system of claim 2 wherein the second electrically conductive contacts include indium-tin oxide and the third electrically conductive contacts include an opaque conductive material.

12. The display system of claim 1 comprising more than one flexible display sheet.

13. An electrically addressable liquid crystal display system comprising:
a circuit board having a surface comprising a first array of parallel conductive contacts and a second array of parallel conductive contacts orthogonally disposed to the first array, each of the arrays being bounded by two parallel edges; and two reference pins protruding from the surface, each of the pins being disposed at a selected distance from one of the conductive contact array edges and from one another; and
at least one flexible liquid crystal display sheet disposed above and electrically connected with the circuit board, the liquid crystal display sheet comprising a transparent flexible substrate, a transparent first electrically conductive layer comprising a first array of parallel conductive traces bounded by two parallel edges disposed on the substrate, a light modulating layer comprising a liquid crystalline material dispersed in a polymeric binder disposed on the first electrically conductive layer, and a second electrically conductive layer comprising a second array of parallel conductive traces bounded by two parallel edges disposed on the light modulating layer, the arrays being orthogonally disposed to each other, each of the conductive traces in the trace arrays being in electrical communication with a conductive contact in the contact arrays, thereby defining rows and columns of pixels; the liquid crystal display sheet further comprising two reference holes through the sheet, each of the holes being disposed at a selected distance from one of the conductive trace array edges and from one another, the reference holes in the liquid crystal display sheet being in vertical alignment with and engaged with the reference pins on the underlying circuit board;
whereby the arrays of conductive contacts on the circuit board are aligned with the arrays of conductive traces on the liquid crystal display sheet.

14. The display system of claim 13 wherein the flexible substrate is formed from a material selected from the group consisting of polyesters, polyolefins, polycarbonates, vinyl resins, acrylic resins, and methacrylic resins.

15. The display system of claim 13 wherein the first and second electrically conductive layer each includes indium-tin oxide.

16. The display system of claim 13 wherein the first electrically conductive layer includes indium-tin oxide and the second electrically conductive layer includes an opaque conductive material.

17. The display system of claim 13 wherein the liquid crystalline material is a cholesteric material.

18. The display system of claim 13 wherein the polymeric binder is selected from the group consisting of deionized gelatin, polyolefins, polystyrenes, acrylic resins, methacrylic resins, urethane resins, and epoxy resins.

19. The display system of claim 13 comprising more than one the liquid crystal display sheet electrically connected with the circuit board.

20. The display system of claim 19 comprising three liquid crystal display sheets electrically connected with the circuit board and disposed one above the other, one of the display sheets being reflective of green light, a second reflective of blue light, and a third reflective of red light.

21. The display system of claim 13 wherein each of the two pins is disposed at a selected distance from each of the parallel edges of the first conductive contact array.

22. The display system of claim 13 wherein one of the two pins is disposed at a selected distance from one of the edges of the first conductive contact array, the other of the pins being disposed at a selected distance from an edge of the second conductive contact array distal from the first conductive contact array, the pins thereby being diagonally disposed with respect to the conductive trace arrays of the liquid crystal display sheet.

23. A process for forming an electrically addressable liquid crystal display system comprising:
providing a circuit board having a surface comprising a first array of parallel conductive contacts and a second array of parallel conductive contacts orthogonally disposed to the first array, each of the arrays being bounded by two parallel edges; and two reference pins protruding from the surface, each of the pins being disposed at a selected distance from one of the conductive contact array edges and from one another;

providing at least one liquid crystal display sheet comprising a flexible substrate, a transparent first electrically conductive layer comprising a first array of parallel conductive traces bounded by two parallel edges disposed on the substrate, a light modulating layer comprising a liquid crystalline material dispersed in a polymeric binder disposed on the first electrically conductive layer, and a second electrically conductive layer comprising a second array of parallel conductive traces bounded by two parallel edges disposed on the light modulating layer, the arrays being orthogonally disposed to each other, each of the conductive traces in the trace arrays being in electrical communication with a conductive contact in the contact arrays, thereby defining rows and columns of pixels;

forming two reference holes through the liquid crystal display sheet, each of the holes being disposed at a selected distance from one of the conductive trace array edges and from one another; and positioning the liquid crystal display sheet on the circuit board to cause the reference pins to be in vertical alignment with and to engage the reference holes, thereby causing the arrays of conductive contacts on the circuit board to be aligned with the arrays of conductive traces on the liquid crystal display sheet.

24. The process of claim 23 wherein the flexible substrate is formed from a material selected from the group consisting of polyesters, polyolefins, polycarbonates, vinyl resins, acrylic resins, and methacrylic resins.

25. The process of claim 23 wherein the first and second electrically conductive layers each includes indium-tin oxide.

26. The process of claim 23 wherein the first electrically conductive layer includes indium-tin oxide and the second electrically conductive layer includes an opaque conductive material.

27. The process of claim 23 wherein the liquid crystalline material is a cholesteric material.

28. The process of claim 23 wherein the polymeric binder is selected from the group consisting of deionized gelatin, polyolefins, polystyrenes, acrylic resins, methacrylic resins, urethane resins, and epoxy resins.

29. The process of claim 23 comprising more than one the liquid crystal display sheet electrically connected with the circuit board.

30. The process of claim 29 comprising three liquid crystal display sheets electrically connected with the circuit board and disposed one above the other, one of the sheets being reflective of green light, a second reflective of blue light, and a third reflective of red light.

31. The process of claim 23 wherein each of the two pins is disposed at a selected distance from each of the parallel edges of the first conductive contact array.

32. The process of claim 23 wherein one of the two pins is disposed at a selected distance from one of the edges of the first conductive contact array, the other of the pins being disposed at a selected distance from an edge of the second conductive contact array distal from the first conductive contact array, the pins thereby being diagonally disposed with respect to the conductive trace arrays of the liquid crystal display sheet.

* * * * *